United States Patent [19]

Okura

[11] Patent Number: 4,577,469
[45] Date of Patent: Mar. 25, 1986

[54] DEVICE FOR DETECTING OVERCHARGE OF REFRIGERANT IN AIR CONDITIONER FOR AUTOMOBILES

[75] Inventor: Eiji Okura, Konan, Japan

[73] Assignee: Diesel Kiki Co., Ltd., Tokyo, Japan

[21] Appl. No.: 623,766

[22] Filed: Jun. 20, 1984

[30] Foreign Application Priority Data

Jul. 2, 1983 [JP] Japan .................. 58-103246[U]

[51] Int. Cl.⁴ .............................................. F25B 49/00
[52] U.S. Cl. .................................. 62/126; 62/133; 62/509
[58] Field of Search .................. 62/228.1, 131, 126, 62/129, 133, 509

[56] References Cited

U.S. PATENT DOCUMENTS

| | | | |
|---|---|---|---|
| 4,096,706 | 6/1978 | Beckwith | 62/509 X |
| 4,167,858 | 9/1979 | Kojima et al. | 62/126 |
| 4,522,037 | 6/1985 | Ares et al. | 62/509 X |

Primary Examiner—William E. Wayner
Attorney, Agent, or Firm—Wenderoth, Lind & Ponack

[57] ABSTRACT

Provided in this invention is a device for detecting overcharge of refrigerant in the cooling cycle in an air-conditioner for automobiles, featuring the provision of a sensor for detecting the liquid level in the receiver tank in the cooling cycle. Means are provided for preventing misoperation of the liquid level sensor due to the rotational speed of the compressor drive system and the transient response immediately after start of the compressor, thereby allowing correct detection of overcharge of refrigerant in the cooling cycle.

4 Claims, 6 Drawing Figures

DEVICE FOR DETECTING OVERCHARGE OF REFRIGERANT IN AIR CONDITIONER FOR AUTOMOBILES

FIELD OF THE INVENTION

This invention relates to a device for detecting overcharging in the cooling cycle in air conditioner for automobiles.

BACKGROUND OF THE INVENTION

When the cooling cycle of a cooling system is overcharged with a refrigerant, the surplus gas is compressed by a compressor, so that an abnormal high pressure is built up in the cycle to give an ill effect to the pressure resistance of the cycle parts. This may also cause improper cooling or an increased power requirement. Further, in such a situation, liquid compression would be done by the compressor to invite damage to the compressor valves. Devices for avoiding such trouble, for instance, refrigerant overcharge detectors comprising a liquid level sensor disposed at an upper part of a receiver tank and designed to detect the overcharge from the output of said sensor are disclosed in Japanese Utility Model Publication No. 14303/72, Japanese Utility Model Laid-Open No. 130175/80 and other literatures.

However, the results of the experiments conducted by the present inventors on said disclosed devices clarified that these devices with said simple setup tend to give rise to the problems such as mentioned below.

Firstly, in these conventional devices, as seen from FIG. 1 where the rotational speed of the compressor drive system is plotted as abscissa and the liquid level in a receiver tank as ordinate, the liquid level in the receiver tank rises up in accordance as the compressor speed increases, and when the detection is made at a compressor speed above a certain specified value, an overcharge detection signal could be issued even if the refrigerant charge is normal. This is due to the following reason: when the speed of the compressor drive system elevates, the amount of air received by the condenser is accordingly increased to cause a rise of its capacity, admitting a greater amount of refrigerant into the receiver tank.

Also, as seen from FIG. 2 where the compressor operation time is plotted as abscissa and the liquid level in the receiver tank as ordinate, the liquid level sharply rises up immediately after start of the compressor and its peak is expressed as a transient response and it could be erroneously detected as an overcharge. This happens because during the period immediately after start of the compressor, the liquid refrigerant which has been stored in the condensor while the compressor was inoperative is caused to rush into the receiver tank.

SUMMARY OF THE INVENTION

The object of this invention is to prevent any misoperation originating in the transient response immediately after start of the compressor in the detection of overcharge.

In order to accomplish said object, the present invention provides a device for detecting overcharge of refrigerant in an air conditioner for automobiles, said device comprising a means for detecting the speed of the compressor drive system, a liquid level sensor for detecting the liquid refrigerant level in a receiver tank, a delay means for delaying the output signal from said liquid level sensor or the ON signal from said compressor for a given period of time, and a control means which allows the issuance of an overcharge detection signal only when an output was given from at least both said delay means and said speed detecting means.

Thus, according to the mechanism of this invention, the output from the liquid level sensor is treated as "effective" only when the speed of the compressor drive system is below a specified value and the transient response at the start of the compressor has disappeared to bring about a stable state, and thereby the said object of the invention can be achieved.

DETAILED DESCRIPTION OF THE INVENTION

The present invention will be described in detail hereinbelow by way of its embodiments with reference to the accompanying drawings.

Figure 2:
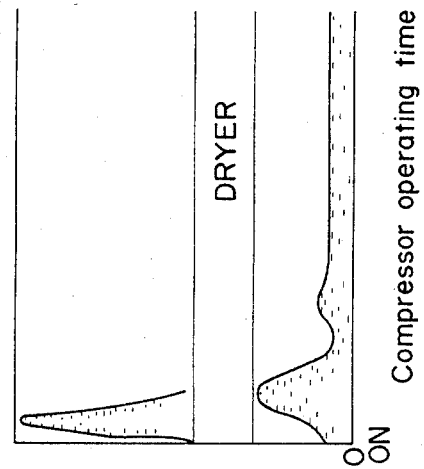
FIG. 2 is a characteristic diagram showing the relation between the compressor operation time and the liquid level in the receiver tank.
Figure 1:
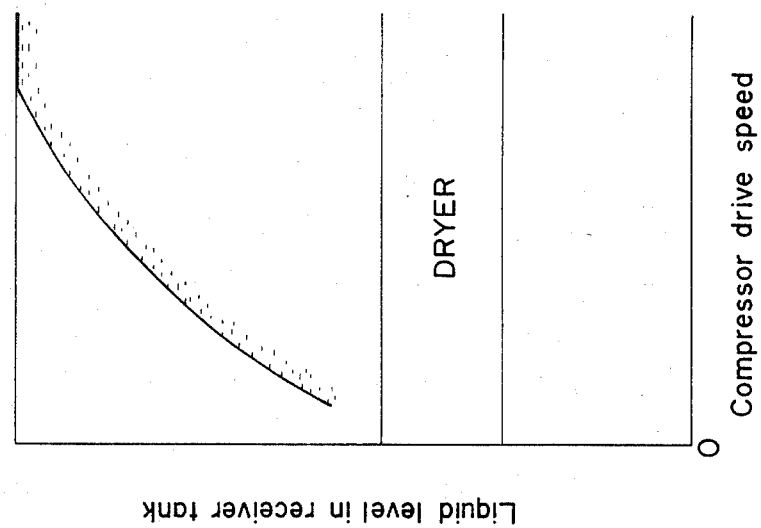
FIG. 1 is a characteristic diagram showing the relation between the speed of compressor drive system and liquid level in a receiver tank.
Figure 3:
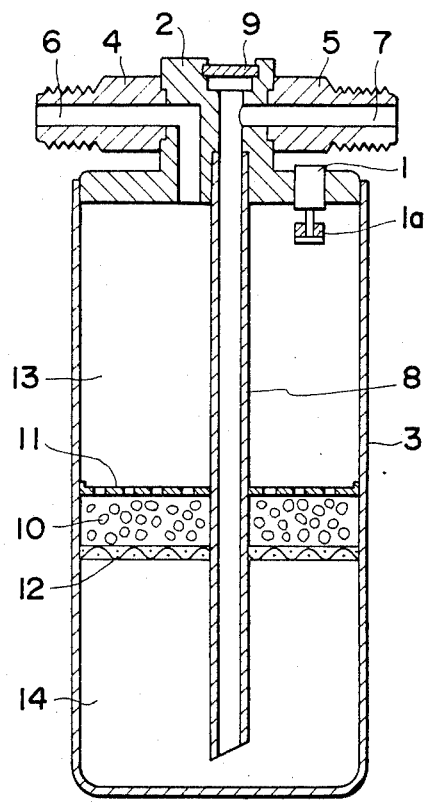
FIG. 3 is a block diagram showing an example of receiver tank construction in an embodiment of this invention.
Figure 4:
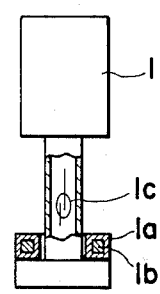
FIG. 4 is a sectional view of the liquid level sensor.

Referring first to FIGS. 3 and 4, there is exemplified the construction of a receiver tank in which the liquid level sensor 1 according to this invention is set. The receiver tank consists of a header 2 and a tank body 3 connected to said header 2. An inlet pipe 4 and an outlet pipe 5 are connected to the header 2, and an inlet passage 6 formed in said header 2 and inlet pipe 4 opens into the tank body 3. An outlet passage 7 is formed in said header 2 and outlet pipe 4, said outlet passage 7 being connected to a suction pipe 8 whose other end reaches close to the bottom of the tank body 3. Numeral 9 in FIG. 3 denotes a sight glass through which the operator can see the condition of the refrigerant passing in said outlet passage 7.

In said tank body 3, substantially centrally thereof, is provided a layer of desiccant 10 sandwiched between a baffle 11 and a filter 12, whereby the interior of the tank body 3 is divided crosswise into an upper compartment 13 and a lower compartment 14.

Said inlet pipe 4 is connected to a condenser while said outlet pipe 5 is connected to an expansion valve to constitute a cooling cycle, and in this cooling cycle, a gas-liquid mixed refrigerant condensed by said condensor is supplied through the inlet passage 6 into the upper compartment 13 where said mixed refrigerant is separated into gas and liquid. The separated liquid refrigerant passes through the desiccant 10 into the lower compartment 14 and is reservoired therein. The liquid refrigerant in said lower compartment 14 is sucked up through the suction pipe 8 and further passed through the outlet passage 7 toward its expansion valve side.

The liquid level sensor according to this invention is provided close to the top end of the upper compartment 13 of the tank. Said sensor 1 may be of a float type comprising a float 1a carrying a magnet 1b. The float 1a is also provided with a lead switch 1c disposed on the fixed end side of the float, said lead switch 1c being so designed that it lets out an output when the position of the float 1a elevates, that is, when the liquid refrigerant level in the receiver tank rises up abnormally. A thermosensitive element such as disclosed in Japanese Utility Model Publication No. 14303/72 or a light sensor may be used as said liquid level sensor 1.

Figure 5:
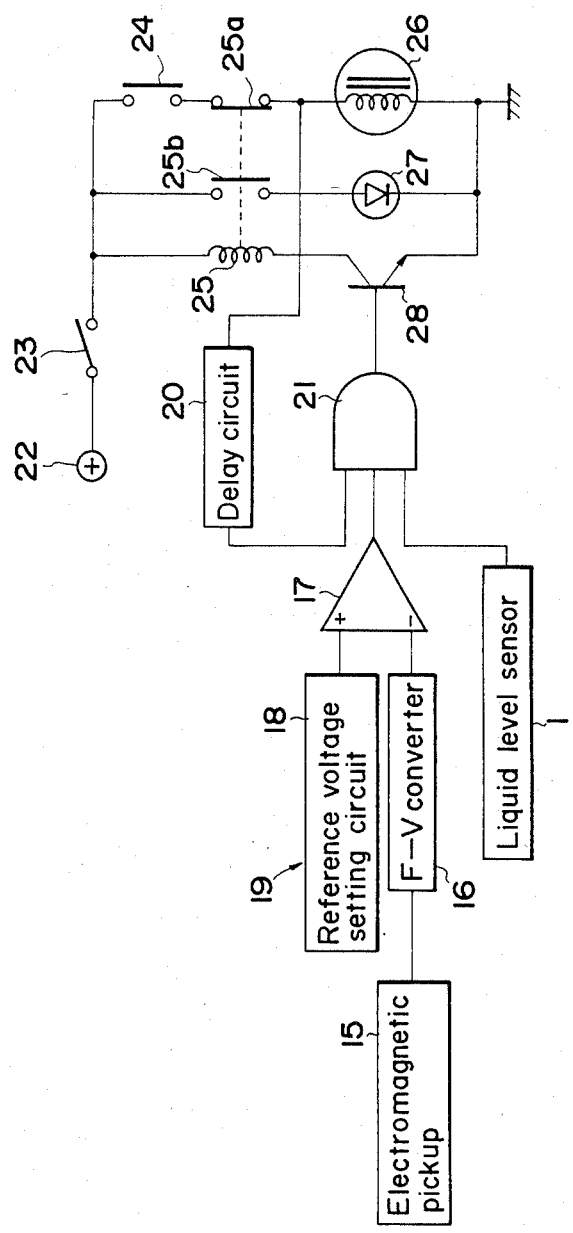
FIG. 5 is a block diagram showing a first example of circuit arrangement according to this invention.

FIG. 5 is a block diagram exemplifying the circuit arrangement according to this invention. In this invention, the rotational speed of the compressor drive system not shown is detected as a pulse signal by an electromagnetic pickup 15, and this detected signal is converted into a voltage signal by an F-V converter 16 and input to a comparator 17 described below. The term "compressor drive system" is used in this specification to refer to not only the compressor itself but also the engine which drives the compressor as well as the belt transmission for transmitting the driving force from the engine to the compressor.

Comparator 17 operates to compare the input voltage proportional to said rotational speed with the reference voltage set by a reference voltage setting circuit 18, and it outputs "H" when the detected rotational speed is below a specified value (for example 3,000 r.p.m.) and "L" when the detected speed is above said specified value. Said electromagnetic pickup 15, F-V converter 16, comparator 17 and reference voltage setting circuit 18 constitute in combination a speed detector 19 for detecting the rotational speed of the compressor drive system.

The output terminals of the comparator 17 of said speed detector 19, the liquid level sensor 1 and a delay circuit 20 forming a delaying means described below are connected to the input terminal of an AND circuit 21 designed to serve as a control means, thereby constituting the refrigerant overcharge detecting device according to this invention.

Said delay circuit 20 operates to delay the ON signal of the compressor for a predetermined period of time (for example, 30 seconds), and the input terminal of said delay circuit 20 is connected to a corresponding terminal of an electromagnetic clutch 26 in a compressor drive circuit which comprises a power source 22, a main switch 23, a thermo-switch 24, a contact 25a of a relay mentioned below and an electromagnetic clutch 26 of the compressor, said elements being connected in series to each other. There is also provided an alarm lamp 27 arranged in parallel to said electromagnetic clutch 26. Thus, when the relay coil 25 is excited, the contact 25a of said relay is opened to disconnect the electromagnetic clutch 26 from the power to shut down the compressor while another contact 25b of said relay is closed to light the alarm lamp 27. Said relay coil 25 is excited when a transistor 28 is energized. Energization and disenergization of said transistor 28 is controlled in correspondence to the output of said AND circuit 21.

In the above-described mechanism, when said both main switch 23 and thermo-switch 24 are turned on, the power is connected to the electromagnetic clutch 26 to start the operation of the compressor. This is a transient response immediately after start of the compressor, but since the ON signal of the compressor is delayed by the delay circuit 20, the output of the delay circuit 20 becomes "H" after said transient response disappears. When the rotational speed of the compressor drive system is above a specified speed, the liquid level in the receiver tank rises up considerably even if the refrigerant charge is normal as mentioned before, but in this situation, the output of the speed detector 19 is "L", and it becomes "H" only when the speed of the compressor drive system becomes lower than the specified speed. Therefore, the output of the liquid level sensor 1 becomes effective only when a predetermined period of time has passed after the start of the compressor and the speed of the compressor drive system is below the specified value. And, in this case, if the cooling cycle is in a state of being overcharged with the refrigerant, the liquid level in the receiver tank rises up abnormally and the output of the liquid level sensor 1 becomes "H", so that the output of the AND circuit 21 also becomes "H" to issue a refrigerant overcharge signal. This energizes the transistor 28 to excite the relay coil 25, whereby the compressor is shut down and the alarm lamp 27 goes on.

Figure 6:
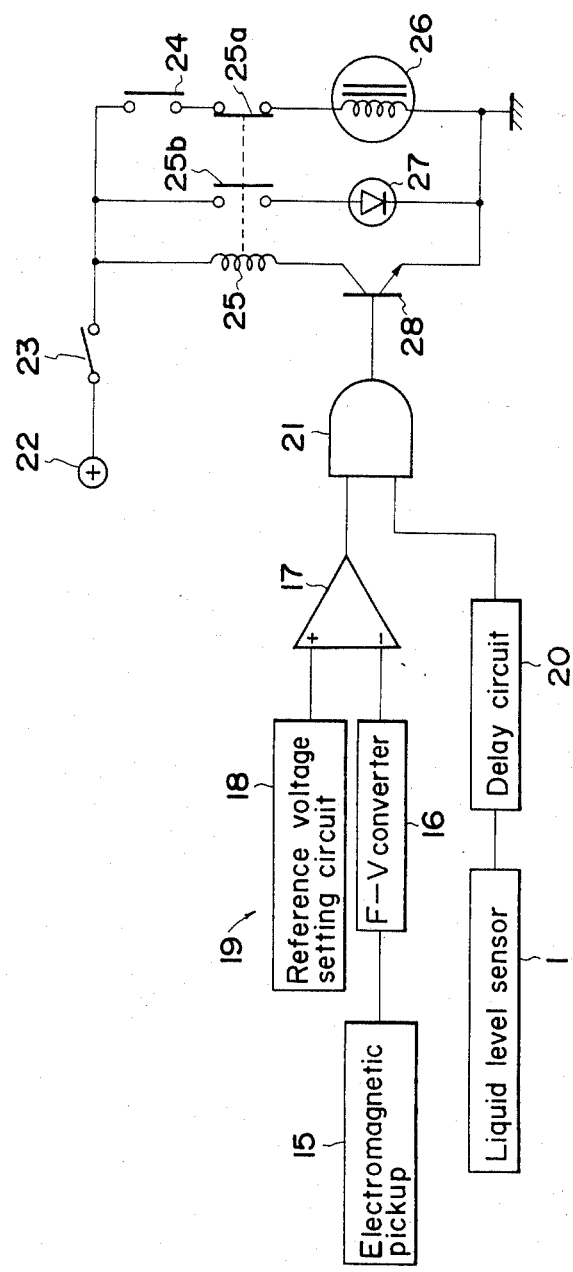
FIG. 6 is a block diagram showing a second example of circuit arrangement according to this invention.

Referring now to FIG. 6, there is shown another example of circuit arrangement according to this invention. This circuit arrangement differs from the above-described first example in the position of the delay circuit 20, that is, in this second example, said delay circuit 20 is so arranged as to delay the output of the liquid level sensor for a given period of time instead of delaying the ON signal from the compressor. In this case, even if an output is given from the liquid level sensor 1, the output of the AND circuit 21 does not become "H" until a predetermined period of time passes, so that it is possible to prevent any misoperation during the period of transient response just after the start of the compressor as in the case of the before-described first embodiment. Also, in this second example of circuit arrangement, since the output form the liquid level sensor won't be turned into a refrigerant overcharge detection signal before the passage of a predetermined period of time, it is possible to prevent not only the misoperation in the starting period of the compressor but also any misoperation originating in abnormal rise of liquid level caused by oiling of the refrigerant in the receiver tank.

The above-shown two examples of circuit construction employ a positive logic arrangement, but it is of course possible to employ a negative logic arrangement or a software scheme by using a microcomputer.

As described above, the present invention provides an improved mechanism for detecting overcharge of refrigerant in which the output from the liquid level sensor is made effective only when the speed of the compressor drive system is below a specified value and also a certain predetermined period of time has passed from the start of the compressor, so that it is possible to prevent any misoperation of the detection system and to positively stave off various kinds of trouble or failure originating in the overcharge.

What is claimed is:

1. A device for detecting overcharge of refrigerant in an air-conditioner for automobiles, comprising a speed detector means for detecting the rotational speed of the compressor drive system in a cooling cycle, a liquid level sensor for detecting the liquid refrigerant level in a receiver tank in said cooling cycle, a means for delaying the ON signal of said compressor for a predetermined period of time, and a control means which outputs an overcharge detection signal only when all of said speed detector means, liquid level sensor and delay means gave an output.

2. A device for detecting overcharge of refrigerant in an air-conditioner for automobiles, comprising a speed detector means for detecting the rotational speed of the compressor drive system in a cooling cycle, a liquid level sensor for detecting the liquid refrigerant level in a receiver tank in said cooling cycle, a delay means for delaying the output of said liquid level sensor for a predetermined period of time, and a control means which outputs an overcharge detection signal only when said speed detector means and delay means gave an output.

3. A refrigerant overcharge detecting device according to claim 1, further comprising an alarm lamp which is lighted in response to the output of said control means.

4. A refrigerant overcharge detecting device according to claim 2, further comprising an alarm lamp which is lighted in response to the output of said control means.

* * * * *